(12) United States Patent
Lauder et al.

(10) Patent No.: US 7,824,512 B2
(45) Date of Patent: *Nov. 2, 2010

(54) MACHINE ASSISTED LAMINATOR AND METHOD

(75) Inventors: Arnold J. Lauder, Winnipeg (CA); Trevor M. McDonald, Winnipeg (CA); Roger J. Ledet, Winnipeg (CA); David Boonstra, Dugald (CA); Antonio Ferreira, Petersfield (CA); Kevin C. Barrett, Winnipeg (CA); John Yestrau, Ste. Anne (CA)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/423,472

(22) Filed: Apr. 14, 2009

(65) Prior Publication Data

US 2009/0205767 A1 Aug. 20, 2009

Related U.S. Application Data

(62) Division of application No. 11/116,222, filed on Apr. 28, 2005, now Pat. No. 7,766,063.

(51) Int. Cl.
*B32B 41/00* (2006.01)

(52) U.S. Cl. .......................... 156/64; 156/285

(58) Field of Classification Search .................. 156/64, 156/258, 267, 285, 286, 351, 353, 358, 359, 156/360, 361, 378, 379; 700/108, 109, 110
See application file for complete search history.

(56) References Cited

U.S. PATENT DOCUMENTS

| | | | |
|---|---|---|---|
| 4,133,711 A | 1/1979 | August et al. | |
| 4,208,238 A | 6/1980 | August et al. | |
| 4,867,834 A | 9/1989 | Alenskis et al. | |
| 4,938,824 A * | 7/1990 | Youngkeit | 156/173 |
| 5,100,493 A * | 3/1992 | Leclere et al. | 156/285 |
| 5,290,386 A | 3/1994 | Trudeau | |
| 5,562,788 A * | 10/1996 | Kitson et al. | 156/64 |
| 6,041,840 A | 3/2000 | Ogawa | |
| 6,164,477 A | 12/2000 | Druckman et al. | |
| 6,325,568 B1 | 12/2001 | Druckman et al. | |
| 6,391,436 B1 | 5/2002 | Xu et al. | |
| 6,451,152 B1 | 9/2002 | Holmes et al. | |
| 6,520,234 B1 | 2/2003 | Anderson et al. | |
| 6,799,619 B2 | 10/2004 | Holmes et al. | |
| 6,968,971 B2 | 11/2005 | Ely | |
| 7,213,629 B2 | 5/2007 | Ledet et al. | |
| 7,341,086 B2 | 3/2008 | Nelson | |
| 7,455,742 B2 * | 11/2008 | Ledet et al. | 156/64 |
| 2003/0102070 A1 | 6/2003 | Black et al. | |

(Continued)

OTHER PUBLICATIONS

Cincinnati Milacron, "Into the Future: With Better Ways to Automate the Manufacture of Composite Parts", 1988, Published by Cincinnati Milacron as Publication No. SP-152-3, all pages.*

*Primary Examiner*—George R Koch, III

(57) ABSTRACT

A method of fabricating a composite part comprises generating a partial vacuum between a ply material and a form, advancing the partial vacuum and the ply material along the form, sensing an edge of a previously applied course of the ply material and cutting a profile on the ply material in response to the sensed edge.

25 Claims, 7 Drawing Sheets

U.S. PATENT DOCUMENTS

2003/0145932 A1 * 8/2003 Holmes et al. ............ 156/64
2004/0226651 A1   11/2004 Ledet et al.
2006/0106507 A1   5/2006 Ledet et al.

* cited by examiner

MACHINE ASSISTED LAMINATOR AND METHOD

CROSS-REFERENCE TO RELATED APPLICATIONS

This application is a divisional of and claims priority to U.S. application Ser. No. 11/116,222 filed on Apr. 28, 2005 and entitled MACHINE ASSISTED LAMINATOR AND METHOD, the entire contents of which is expressly incorporated herein by reference.

FIELD

The present disclosure generally relates to a ply placement device. More particularly, the present disclosure pertains to a device for and method of placing plies on a surface.

BACKGROUND

Composite items are generally constructed from layers of material that are laminated together. These layers are often referred to as partial or full plies. For structures exceeding the available material width, each layer is typically made up of a series of strips or courses of material placed edge to edge next to each other or are overlapped to some extent. Each ply may be in the form of woven fibers in a fabric, unidirectional fiber material, metal foils, adhesive films or a variety of other conformations. Unidirectional fiber material is often termed, "tape." The fibers may be made from any of a multitude of natural and/or "man-made" materials such as fiberglass, graphite, Kevlar®, and the like.

The courses are generally laid upon the form or tool along a "natural path" of the course material. The term "natural path" refers to the path the course material would follow when rolled out on to the surface of the tool. Deviations from the natural path are generally achieved by applying force across the width of the course material. Tape is typically more rigid than fabric and tends to resist this force to a greater extent. When the force applied exceeds the flexing capacity of the material, wrinkles or bridges form in the course material. In addition, the wider the course is, the more prone the course material is to wrinkle.

Tape courses are typically applied edge to edge. To reduce internal voids, it is generally advantageous to reduce the gap distance or tolerance between the tape courses. For example, in certain relatively high technology industries such as the aerospace industry, the gap distance may be held to 0.10" or less. For flat or cylindrical composite items, the natural path of each course is in alignment with adjacent courses. However, for contoured items, the natural path of adjacent courses may tend to cause the courses to converge or diverge. To prevent these deviations from causing the courses to overlap or diverge in excess of the tolerance, conventional automated tape lamination machines ("ATLM") generally utilize a relatively greater number of a relatively narrower course material. Unfortunately, utilizing narrower course material reduces lay-down rates.

Accordingly, it is desirable to provide a method and apparatus capable of overcoming the disadvantages described herein at least to some extent.

SUMMARY

The foregoing needs are met, to a great extent, by the present disclosure, wherein in one respect an apparatus and method is provided that in some embodiments accurately place plies on a substrate.

An embodiment of the present disclosure relates to a system to fabricate a composite item. This system includes an end effector, robotic vehicle, sensor, and cutting system. The end effector applies a course to a layup form. The robotic vehicle positions the end effector. The sensor senses an edge of a previously applied course. The cutting system cuts a profile on the course in response to the sensed edge.

Another embodiment of the present disclosure pertains to an apparatus to fabricate a composite item. This apparatus includes a means for generating, means for advancing, means for sensing, and means for cutting. The means for generating generates a partial vacuum between a ply material and a layup form. The means for advancing advances the partial vacuum and the ply material along the layup form. The means for sensing senses an edge of a previously applied course of the ply material. The means for cutting cuts a profile on the ply material in response to the sensed edge.

Yet another embodiment of the present disclosure relates to a method of fabricating a composite item. In this method, a partial vacuum is generated between a ply material and a layup form and the partial vacuum and the ply material are advanced along the layup form. In addition, an edge of a previously applied course of the ply material is sensed and a profile is cut on the ply material in response to the sensed edge.

There has thus been outlined, rather broadly, certain embodiments of the disclosure in order that the detailed description thereof herein may be better understood, and in order that the present contribution to the art may be better appreciated. There are, of course, additional embodiments of the disclosure that will be described below and which will form the subject matter of the claims appended hereto.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

Figure 1:
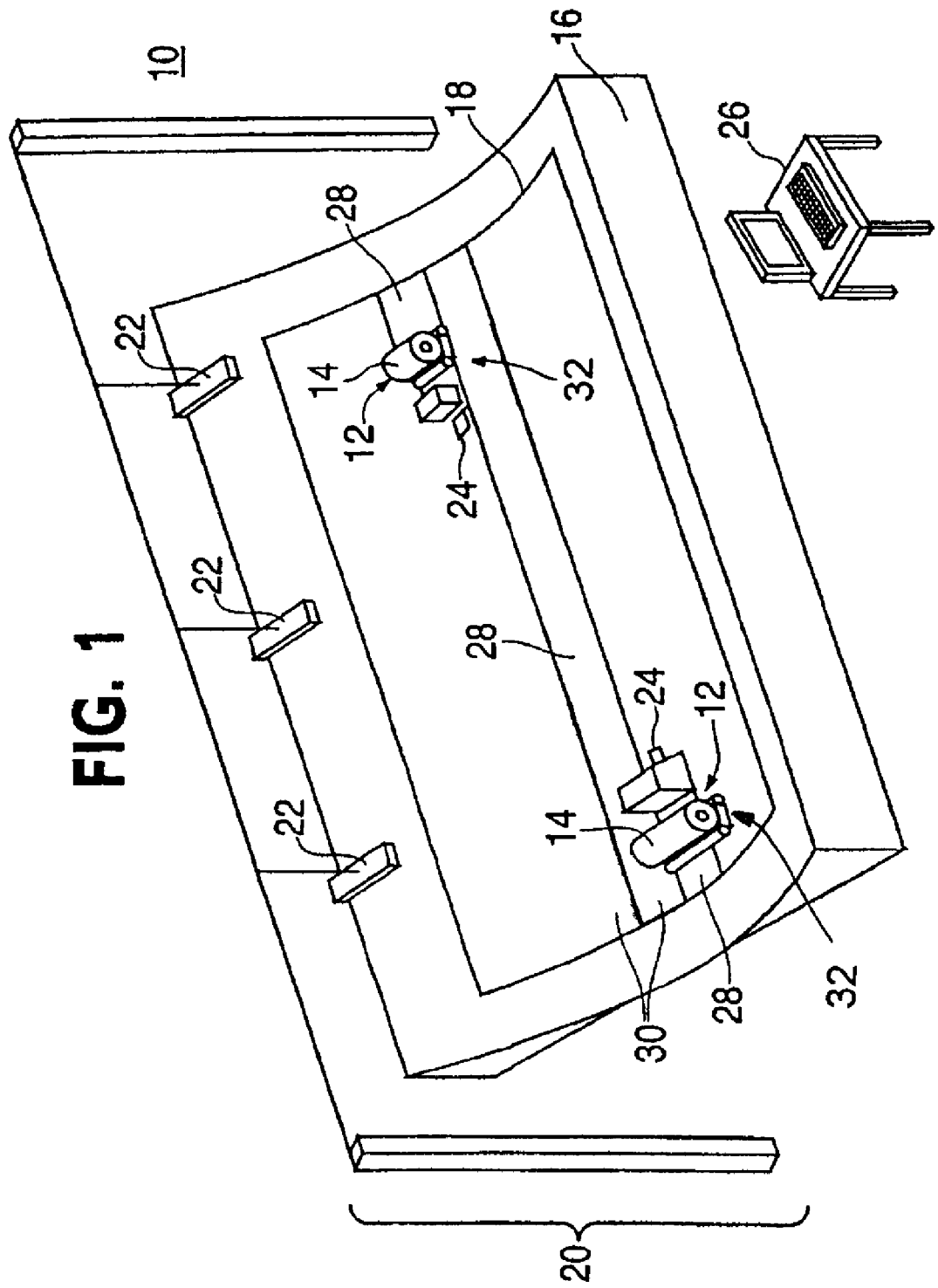
FIG. 1 is a perspective view of an automated tape lamination machine according to an embodiment of the disclosure.

The disclosure will now be described with reference to the drawing figures, in which like reference numerals refer to like parts throughout. As shown in FIG. 1, a machine assisted laminator 10 ("MAL") suitable for use in an embodiment of the disclosure includes one or more robotic vehicles 12 to position a ply material 14 upon a form 16 to generate an item 18. The robotic vehicles 12 are guided by a guidance system 20. The guidance system 20 includes one or more laser emitters 22, laser receivers 24, and a control unit 26. The control unit 26 is configured to receive instructions from a user and forward instructions to the laser emitters 22. The laser emitters 22 are configured to forward signals, via laser, to the laser receivers 24 and thereby control the movement of the robotic vehicles 12. In this manner, a set of computer readable instructions are utilized by the MAL 10 to fabricate the item 18. A more detailed description of the robotic vehicles 12 and the guidance system therefore are to be found in U.S. patent application Ser. No. 10/986,292, entitled, OPTICAL LASER GUIDANCE SYSTEM APPARATUS AND METHOD, filed on Nov. 12, 2004, by Roger J. LEDET and John E. YESTRAU, the disclosure of which is hereby incorporated in its entirety.

In an embodiment, the MAL 10 includes two or more robotic vehicles 12 configured to co-operatively apply the ply material 14 to the form 16. For example, as shown in FIG. 1, each robotic vehicle 12 initiates placement of the ply material 14 at or near a center portion of the form 16 and then co-operatively work outward and to different portions of the form 16. Thus, it is an advantage of embodiments of the disclosure that material lay down rates are increased over ATLMs that have only one conventional end effector. In another example, the robotic vehicles 12 are configured to co-operatively weave two or more layers of the ply material 14 together upon the form 16. Thus, it is an advantage of embodiments of the disclosure that structural integrity of the item 18 is increased and de-lamination of the item 18 is decreased by weaving multiple layers of the ply material 14 together.

In another embodiment of the disclosure, the MAL 10 includes a robotic armature or gantry-type positioning device configured to position or otherwise control the placement of the ply material upon the form 16. In a particular example, the gantry-type positioning device is configured to control ten axes of movement (five axes of the gantry and five axes of an end effector). However, it is to be understood that the specific number of axes may depend upon the particular operating condition and thus, the number of axes controlled is not critical to the disclosure. In yet other embodiments, the set of computer readable instructions are utilized to control the movements of the tool 16. For example, the tool 16 includes a rotating mandrel or X-Y table.

Each robotic vehicle 12 is configured to apply course material 14 on the form 16. In various forms, the robotic vehicles 12 include a compaction roller, sweep, and/or vacuum placement shoe to apply the course material 14 to the form 16. The form 16 is configured to provide a suitably stable and finished surface for ply placement. Characteristics of the form 16, such as size, shape, contour, and the like, are based upon design parameters of an item 18. The item 18 is shown in FIG. 1 being constructed from a plurality of courses 28. Each layer of the courses 28 placed upon the form 16 or a substrate 30 is described as a ply and the item 18 is typically fabricated from a plurality of plies. The substrate 30 includes the form 16 surface and/or a previously applied course 28.

Figure 2:
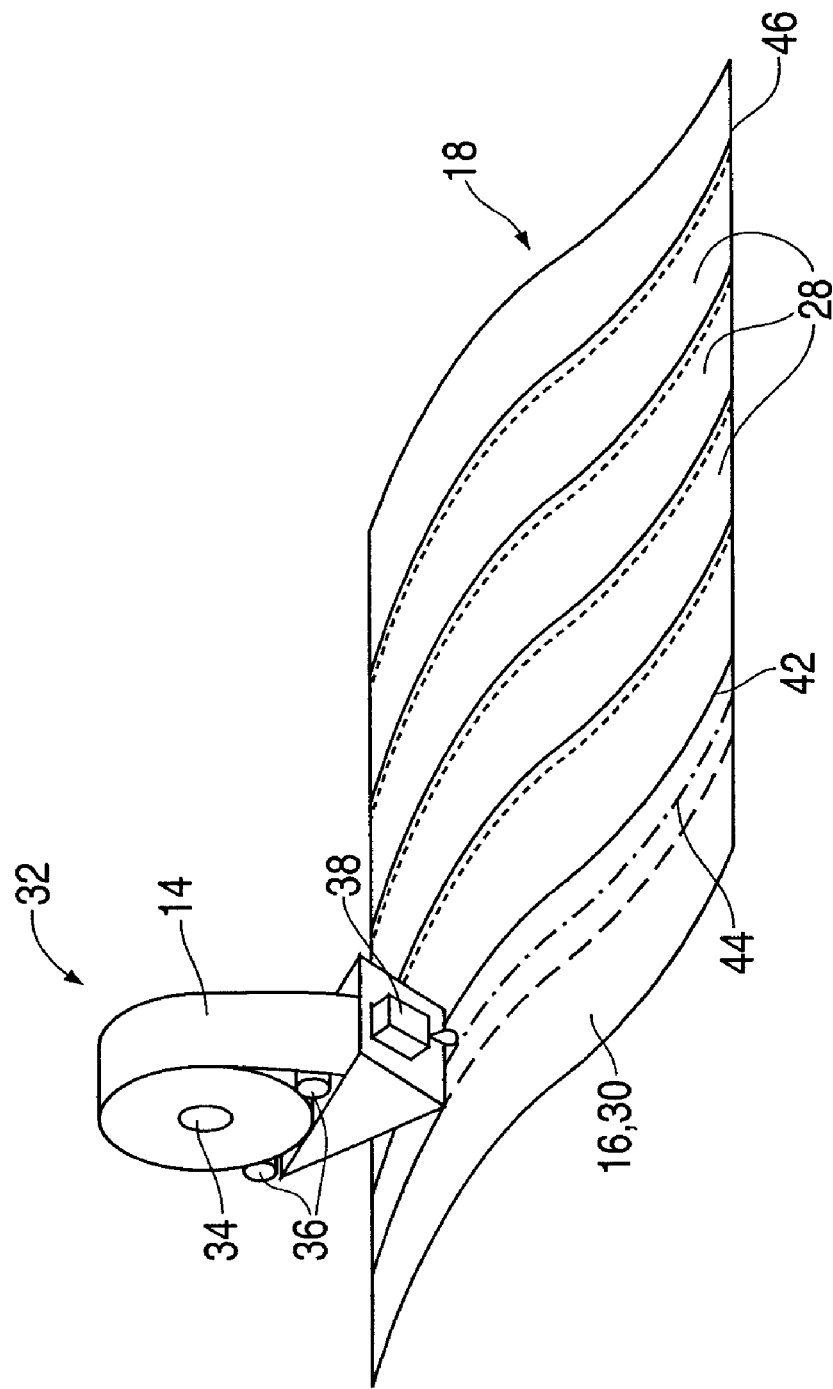
FIG. 2 is a perspective view of a front of an end effector suitable for use with the automated tape lamination machine of FIG. 1.

FIG. 2 is a perspective view of a front of an end effector 32 that is suitable for use with the MAL 10. The end effector 32 is positioned by the robotic vehicle 12 or any suitable positioning device such as, for example, a robotic armature, gantry type device, and the like. As shown in FIG. 2, the end effector 32 includes a supply roll 34 to dispense a course material 14. This supply roll 34 is supported by a support 36. In a particular embodiment, the support 36 includes a pair of rollers to facilitate rolling of the supply roll 34. In this manner, the course material 14 is withdrawn from the supply roll 34. Specifically, the rollers facilitate an unpowered or "free wheeled" removal of the course material 14 from the supply roll 34. That is, the course material 14 is drawn off the supply roll 34 via the movement of the end effector 32 without need of relatively complex servo motors and control systems. Thus, simplifying and improving the reliability.

The course material 14 includes any suitable course material. Examples of suitable course material include various fibers, films, foils, and/or the like. Particular examples of fibers include glass, aramid, carbon, and various other fibers in the form of unidirectional "tape," woven fabric, biaxial cloth and the like. In addition, the course material 14 may be pre-impregnated with a resin or other such binding substance. The course material 14 optionally includes a backing or separator film 40 (Shown in FIG. 4) to substantially prevent the course material 14 from adhering to itself while in roll form.

The end effector 32 further includes a sensor 38. The sensor 38 includes any suitable sensing device. Examples of suitable sensing devices include tactile, optical, and systems employing various forms of electromagnetic radiation such as infra red (IR), microwave, and the like. In a particular example and as discussed further herein, the sensor 38 includes a machine vision system configured to determine the position of an edge 42 of a previously applied course 28. In various other examples, the sensor 38 includes an array of feelers that contact the substrate 30 and sense a difference in height and/or an array of photo detectors that sense differences in incident light reflected from the substrate 30.

The MAL 10 typically applies the course material 14 upon the substrate 30 along a "natural path." Generally, the natural path is described in terms of a path the course material 14 would take when rolled out upon the substrate 30. More specifically, a centerline 44 of the natural path is described geometrically as a geodesic curve on the substrate 30. That is, the shortest distance between two points that lies on the substrate 30.

FIG. 2 additionally illustrates an interface 46 disposed between two adjoining courses 28. This interface 46 generally coincides with the warp direction of the flanking courses 28. The interface 46 may diverge somewhat from the warp direction of one or both of the flanking courses 28 depending upon the taper or profile of the courses 28. The item 18 typically includes multiple plies and it is not uncommon that two or more plies may lay in the same or approximately same warp direction. Plies laying in the same warp direction are generally separated by several plies in other warp directions. Still, it is preferable that interfaces 46 of the plies laying in the same or similar warp direction are not in alignment. It is an advantage of an embodiment that the alignment of the interfaces 46 are determined and adjusted or offset if found to be in alignment.

Figure 3:
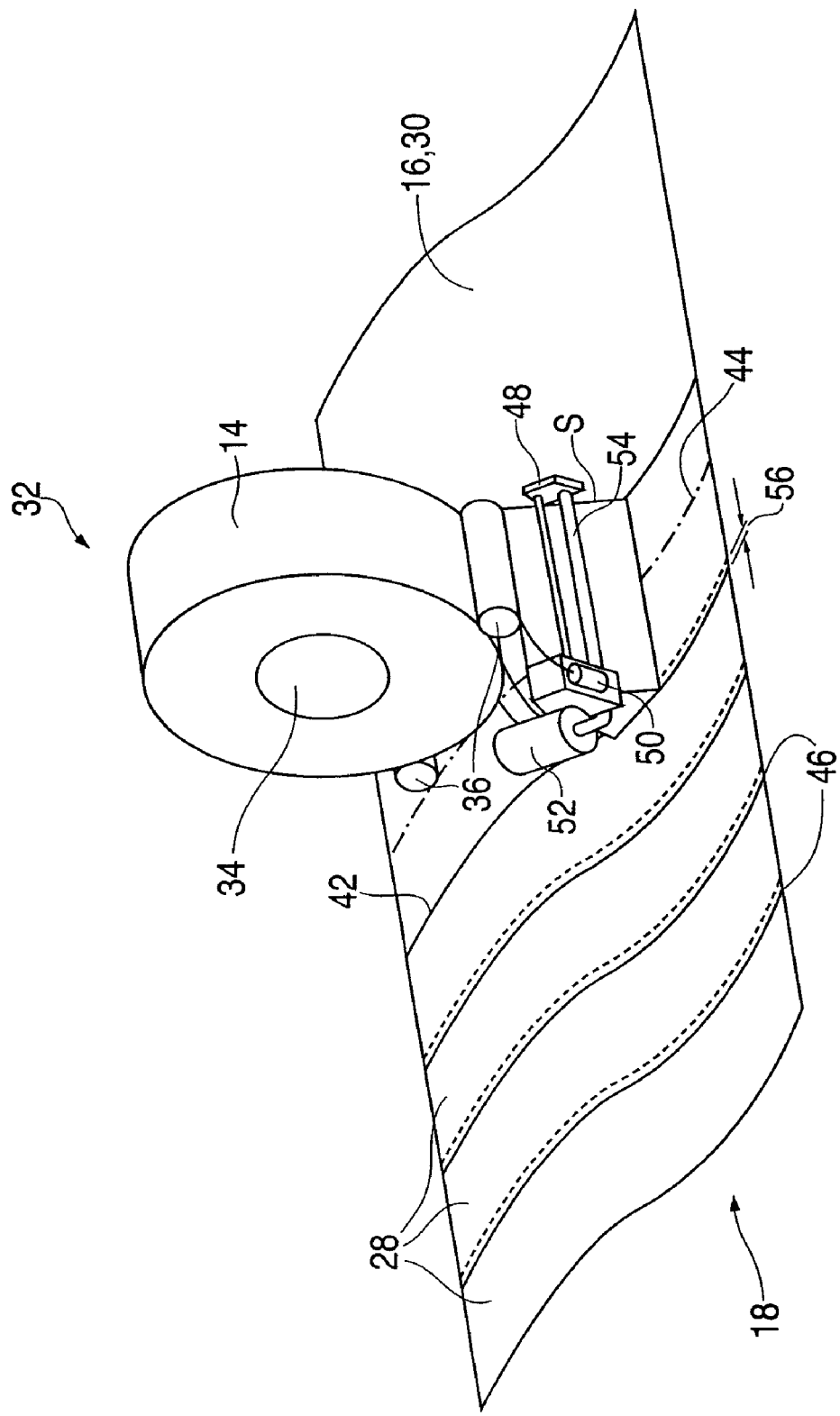
FIG. 3 is a perspective view of a rear of an end effector suitable for use with the automated tape lamination machine of FIG. 1.

FIG. 3 is a perspective view of a rear of the end effector 32 suitable for use with the MAL 10. As shown in FIG. 3, the end effector 32 further includes a cutting assembly 48 configured to cut the course material 14. In general, the cutting assembly 48 performs cuts to generate a side edge profile. In addition, the cutting assembly performs end cuts, such as leading edge and trailing edge cuts. The cutting assembly 48 includes any suitable cutting device 50 operable to sever or otherwise cut the course material 14. Suitable devices include ultrasonic knives, saws, lasers, and the like. Furthermore, the cutting assembly 48 includes an actuator 52 to position the cutting device 50 along a rail 54 that traverses the course material 14. The actuator 52 is configured to respond to signals from a controlling device.

In operation, the MAL 10 is configured to apply the courses 28 to generate a ply of the item 18. The course material 14, is typically applied according to the manufacturer's specifications. For example, courses of unidirectional tape are typically abutted and/or applied within a gap tolerance of about 0.10 inches with essentially no overlap tolerance. In another example, fabric typically has no gap tolerance, but rather, may have an overlap tolerance of 0.25 to 0.50 inches. Depending upon the contour of the substrate 30, the natural path of the courses may converge or diverge beyond these tolerances. In an embodiment, the paths of the courses 28 are defined such that an overlap 56 is generated. The overlap 56 is configured such that at a relative maximum divergence between two abutting courses 28, the respective edges of the abutting courses 28 are not further away than the gap tolerance. In the event that the overlap 56 exceeds the overlap tolerance, excess course material 14 is trimmed. The amount of excess to trim is determined based upon the sensed edge of the previously applied course 28. For example, when applying unidirectional tape, the cutting assembly 48 is controlled to cut a profile along the edge of the course material 14 to essentially coincide with the edge of the previously applied course 28.

In a preferred embodiment, the cutting assembly 48 is configured to function with a vacuum placement shoe S. In general, the vacuum placement shoe S is configured to generate a partial vacuum between the ply material 14 and the substrate 30. As the end effector 32 advances and the ply material 14 is withdrawn from the vacuum placement shoe S, the ply material 14 is pressed upon the substrate 30 via atmospheric pressure. Specifically, the vacuum placement shoe S is configured to form a seal over a portion of the substrate 30 and generate a partial vacuum within the sealed area. The ply material 14 is fed through the sealed area and pressed upon the substrate 30 via atmospheric pressure. A more detailed description of the vacuum placement shoe is to be found in U.S. patent application Ser. No. 10/437,067, entitled VACUUM ASSISTED PLY PLACEMENT SHOE AND METHOD, filed on May 14, 2003, by Roger J. LEDET, Arnold J. LAUDER, and Matthew J. SHEWFELT, the disclosure of which is hereby incorporated in its entirety.

Figure 4:
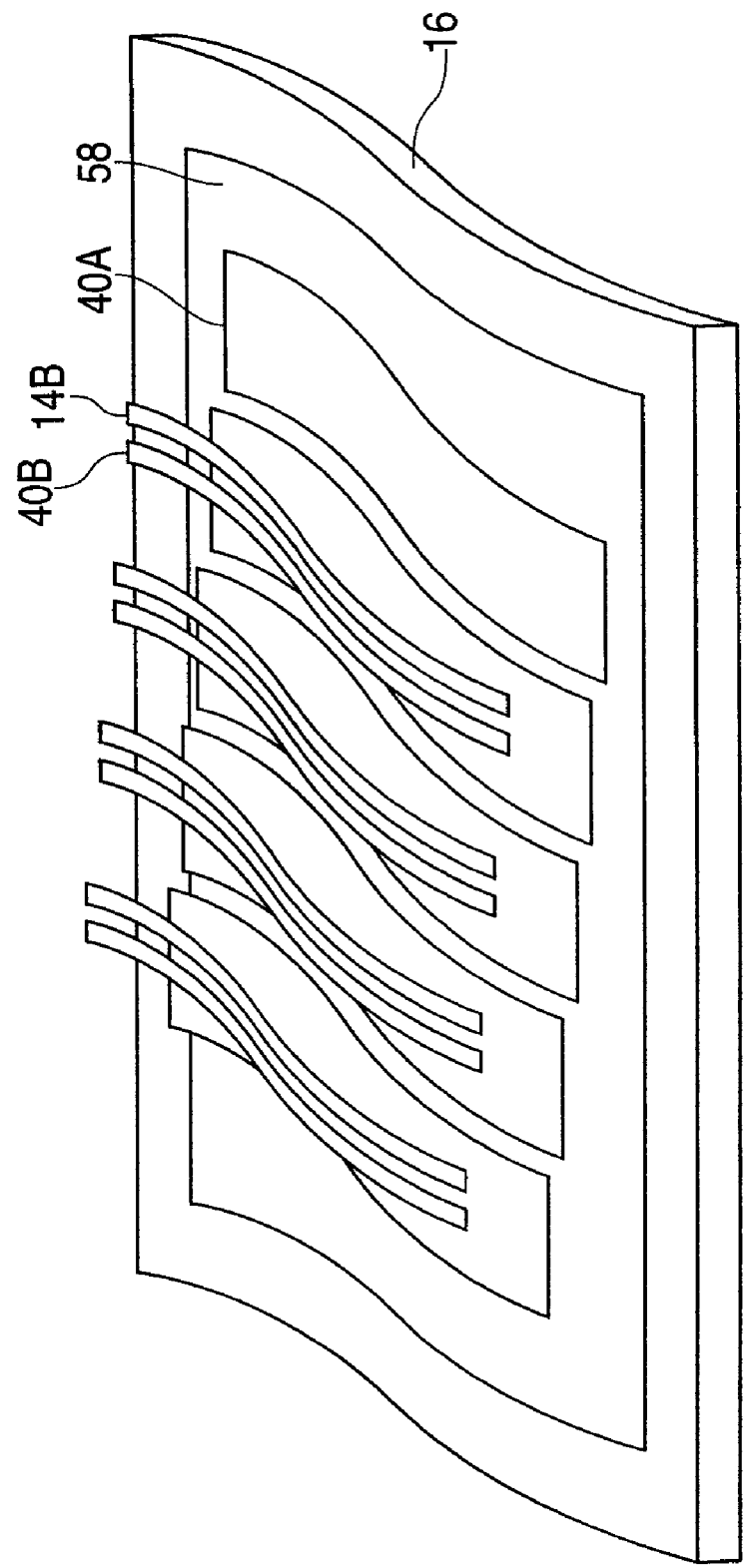
FIG. 4 is an exploded view of a ply layup according to an embodiment of the disclosure.

FIG. 4 is an exploded view of a ply layup according to an embodiment of the disclosure. As shown in FIG. 4, a ply 58 is consolidated upon the form 16. That is, the courses 28 are applied to the form 16 and together these courses generate the ply 58. In the example illustrated in FIG. 4, the separator film 40 is shown severed into strips 40A and 40B with the strip 40A covering the portion of the course material 14 utilized to generate the ply 58 and the strip 40B covering a trimmed excess course material 14B. In another embodiment, the separator film 40 is essentially left intact during edge cutting operations. For example, the cutting assembly 48 is disposed upon the course material 14 side rather than the separator film 40 side and the cutting assembly 48 is configured to substantially leave the separator film 40 uncut as the course material 14 is cut.

According to an embodiment, the separator film 40 is removed following fabrication of the ply 58. It is an advantage of this embodiment that the separator film 40 substantially prevents the excess course material 14B from adhering to the previously applied course 28. As shown in FIG. 4, the separator film 40A substantially prevents the excess course material 14B from adhering to the previously applied course 28. In addition, the separator film 40A facilitates protection of the ply 58 from dust, debris, and physical insult such as, for example, scratches, abrasion, and the like. In various embodiments, the separator film 40 is removed prior to or during application of successive courses of the course material 14 to the substrate 30, as is the case when edges of successive courses of the course material 14 are overlapped. In such instances, a take up reel, for example, is configured to accumulate the separator film 40, 40A and/or 40B, and/or the excess course material 14B. A suitable take up reel for use with the MAL 10 is described in U.S. patent application Ser. No. 10/975,433, entitled, AUTOMATED FABRIC LAYUP SYSTEM AND METHOD, filed on Oct. 29, 2004, by W. Robert NELSON, Michael C. DOWLING, Mark K. STEPHEN, Raymond L. ROYAL, and C. Tim HARBAUGH, the disclosure of which is hereby incorporated in its entirety.

Figure 5:
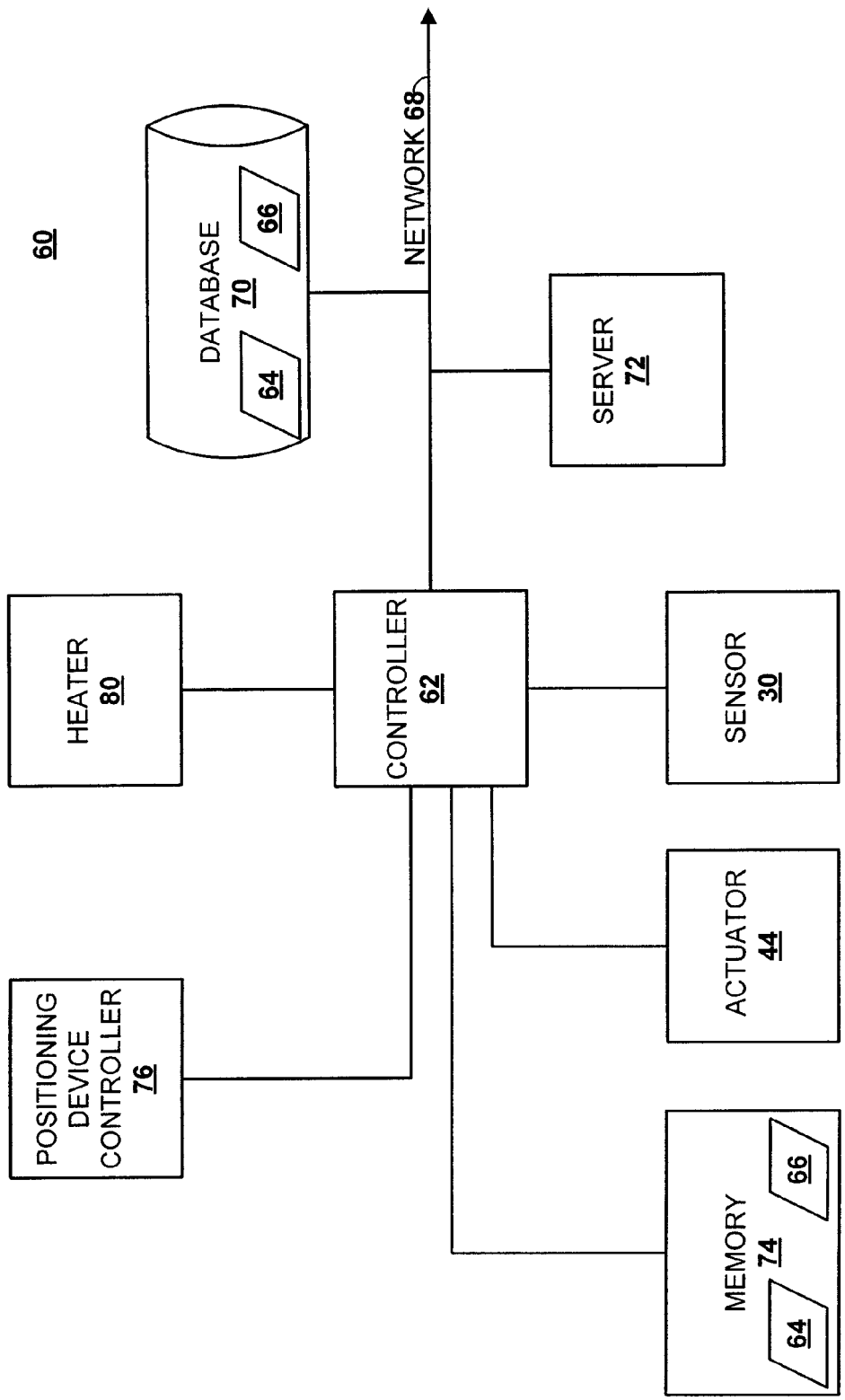
FIG. 5 is a block diagram of a system architecture for an automated tape lamination system in accordance with an embodiment of the disclosure.

FIG. 5 is a block diagram of a system 60 suitable for use with the MAL 10. As shown in FIG. 5, the system 60 includes a controller 62. The controller 62 is operable to execute computer readable code. In this regard, the system 60 includes a set of computer readable instructions or code 64. According to the code 64, the controller 62 is configured to access a file 66. This file 66 includes one or more of the following: a computer readable model of the composite item; a computer readable representation of the surface of the layup form or the form 16; a computer readable representation of the edges of the form 16; the thickness of the composite item; a source code based upon at least one of the composite item and the form 16; a set of movement instructions based upon the source code; data gathered while laying up the composite item; timestamp information; positional information; identification numbers; and the like. The controller 62 is further configured to communicate across a network 68. The network 68 is optionally included to provide additional data storage and/or processing capabilities. In this regard, the network includes a database 70 and a server 72. The database 70 is configured to store a copy of the code 64 and/or file 66. The server 72 is configured to generate, store, and perform any suitable processing of the code 64 and/or file 66. In this manner, composite items generated on computer aided design (CAD) machines such as the server 72, for example, may be forwarded to the MAL 10. In addition, the server 72 is operable, via the network 68, to forward updates for the code 64 and/or file 66. In addition, the system 60 optionally includes a memory 74. If present, the memory 74 is configured to store a copy of the code 64 and/or file 66.

Also shown in FIG. 5 is a positioning device controller 76 to control the robotic vehicle 12 and/or other such positioning devices. The positioning device controller 76 is optionally included in the system 60 depending upon the requirements of the various actuators and/or servo motors of the MAL 10. That is, depending upon the particular configuration of the MAL 10, a plurality of actuators and/or servo motors modulate the rotation, position, speed, direction, and the like of the various components of the MAL 10. More particularly, these actuators and/or servo motors of the robotic vehicle 12 and/or positioning device are at least configured to advance the robotic vehicle 12 or otherwise modulate the various axes of the end effector 32 and/or MAL 10. If present, parameters of the positioning device controller 76 are based upon the specification of the various actuators, servos, and/or the controller 62. The positioning device controller 76, if present, is configured to control some or all of these actuators and/or servo motors. In addition, these actuators and/or servo motors are optionally operable to be modulated by the controller 62 directly, and thus, the system 60 may not include the positioning device controller 76.

In addition, the controller 62 is configured to receive signals from the sensor 38 and, in response to these signals, determine the position of the edge 42 of a previously applied course 28. For example, employing an optical sensor, image signals are received from the sensor 38 and the controller 62, utilizing image analysis algorithms, identifies differences between the edge 42 and the underlying substrate 30. In a particular example, the separator film 40 is a white or light color and the course material 14 and form 16 are black or a relatively darker color. Thus, by identifying an interface between the white and black regions, the position of the edge is determined. In another example, the course material 14 is a relatively light color and the separator film 40 is a relatively darker color. Similarly, other differentiating optical characteristics may be employed to determine the edge. In another example, the sensor 38 includes feelers that contact the substrate and signals from the sensor 38 are utilized to determine a height difference between the previously applied course 28 and the underlying substrate 30.

The controller 62 is further configured to modulate any suitable actuator such as, for example, servo motor, rack and pinions, linear drive belts, linear slides, X-Y tables, pneumatic rams, linear actuators, and the like. In particular, the controller 62 is configured to control the action of the actuator 52 in response to the sensed edge of the previously applied course 28. In this manner, a profile is cut upon an edge of the course material 14, by the cutting assembly which substantially conforms to the sensed edge.

The system 60, optionally, further includes a plurality of sensors configured to sense the various suitable operating conditions or attributes of the MAL 10. Examples of suitable attributes include some or all of the temperature of the course material 14, the temperature at the location where the separator film 40 is separated from the course material 14 (release point), feed rate and direction, material placement, backing integrity, supply of course material 14, and/or the like.

The system 60 optionally includes a heater 80. The heater 80 includes any suitable heating device such as, for example an electrical heating element and blower, infrared device, induction heater, and/or the like. In a particular example, the heater 80 includes a heating element and a blower configured to direct a stream of heated air as appropriate. In addition, the heater 80 optionally includes a nib heater, chute heater, and release point blower. If present, these devices are modulated by the controller 62. The nib heater applies a controlled amount of heat to the form 16, the course material 14 and/or the separator film 40 in response to controlling signals generated by the controller 62. Similarly, the chute heater applies a controlled amount of heat to the course material 14 and/or the separator film 40 in response to controlling signals generated by the controller 62. In addition, the release point blower directs a flow of air toward the release point in response to controlling signals generated by the controller 62.

Figure 6:
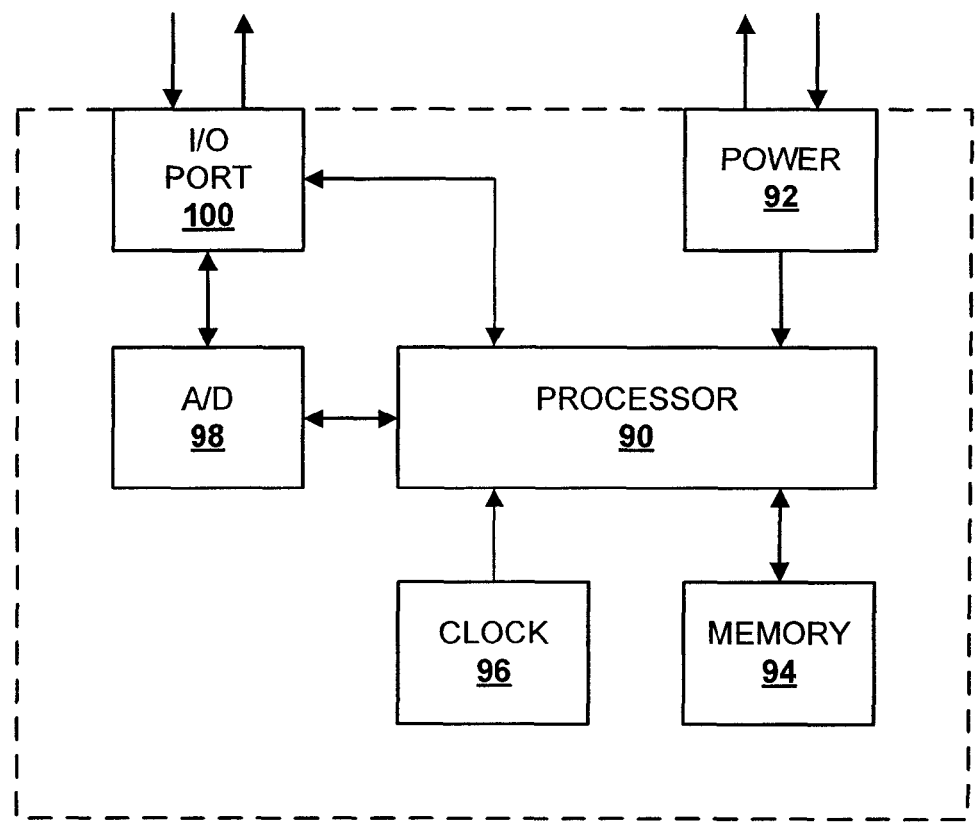
FIG. 6 is a block diagram of a system architecture for a controller suitable for use in the system according to FIG. 5.

FIG. 6 is a system architecture for the controller 62 suitable for use in the system 60. As shown in FIG. 6, the controller 62 includes a processor 90. This processor 90 is operably connected to a power supply 92, memory 94, clock 96, analog to digital converter (A/D) 98, and an input/output (I/O) port 100. The I/O port 100 is configured to receive signals from any suitably attached electronic device and forward these signals to the A/D 98 and/or the processor 90. If the signals are in analog format, the signals may proceed via the A/D 98. In this regard, the A/D 98 is configured to receive analog format signals and convert these signals into corresponding digital format signals. Conversely, the A/D 98 is configured to receive digital format signals from the processor 90, convert these signals to analog format, and forward the analog signals to the I/O port 100. In this manner, electronic devices configured to receive analog signals may intercommunicate with the processor 90.

The processor 90 is configured to receive and transmit signals to and from the A/D 98 and/or the I/O port 100. The processor 90 is further configured to receive time signals from the clock 96. In addition, the processor 90 is configured to store and retrieve electronic data to and from the memory 94. Furthermore, the processor 90 is configured to determine signals operable to modulate the positioning device controller 76 and thereby control the various actuators and/or servo motors of the MAL 10 to exert a particular force and/or rotate to a particular degree.

According to an embodiment of the disclosure, the processor 90 is configured to execute the code 64. Based on this set of instructions and signals from the various components of the MAL 10, the processor 90 is configured to determine a set of controlling signals and forward these signals to the heater 80, cutting assembly 48, and the like.

Figure 7:
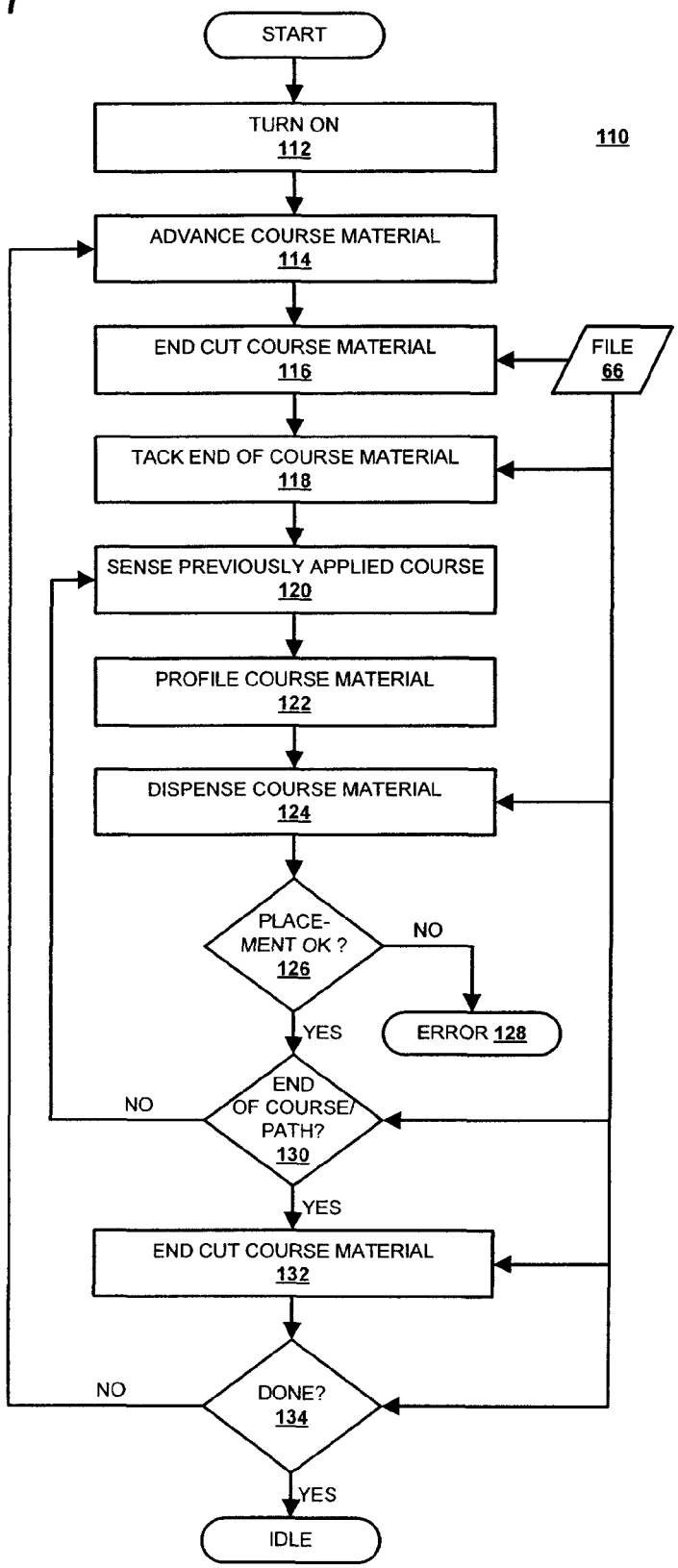
FIG. 7 is a flow diagram illustrating steps of a method in accordance with an embodiment of the disclosure.

FIG. 7 illustrates steps involved in a method 110 of placing plies to produce a composite structure or product. Prior to the initiation of the method 110, a composite product is designed and, based on this design, a series of computer readable instructions specifying attributes of the composite product, such as the item 18, is generated. In addition, a maximum width of material is determined based upon contours of the item 18. For example, the contour along the course paths are determined and if a contour exceeds a recommended contour for a particular width of course material, a narrower or otherwise more accommodating material is selected and the course paths are re-calculated as appropriate.

Furthermore, the interfaces 46 between plies 58 laid in a similar warp direction are determined. If two or more of the interfaces 46 approximately overlap, course paths of at least one of the plies are adjusted or offset and the course paths are re-calculated as appropriate. The computer readable instructions are utilized to control the operations of the MAL 10. In addition, a form or tool such as the form 16 is designed and constructed based upon the design of the composite product. Furthermore, the supply roll 34 is installed in the end effector 32 and the course material 14 is threaded through the end effector 32.

Moreover, co-ordinated movements of a plurality of robotic vehicles 12 are optionally determined. These co-ordinated movements, if present, are stored to the file 66 and utilized to fabricate the item 18. An example of the co-ordinated movements include instructions for a plurality of the robotic vehicles 12 to essentially simultaneously apply the course material 14 to the form 16, thereby increasing the material lay down rate as compared to conventional ATLMs. Another example of the co-ordinated movements include instructions for the plurality of the robotic vehicles 12 to essentially simultaneously apply a woven pattern of the course material 14 to the form 16, thereby increasing the integrity of the item 18 as compared to conventional ATLMs.

At step 112, the method 110 is initiated by turning on the various components of the MAL 10 described herein above and executing the computer readable instructions.

At step 114, the course material 14 is modulated by the action of the positioning device 12 and/or the supply roll 34. For example, in response to the end of the course material 14 differing from the edge of the form 16, the course material 14 is in position to be cut by the cutting assembly 48. It is to be noted that in an embodiment, the course material 14 is essentially always cut along one or both edges (profiles) and that the step 114 is optionally performed to position the course material 14 for a leading edge cut. It is an advantage of this embodiment that a substantially continuous band of edge material is maintained throughout placement of the course material 14 to facilitate removal of the excess course material 14B from the form 16.

At step 116, instructions from the file 66 are utilized for cutting an appropriate leading edge and/or profile for the course material 14 at the start of a course. In response to the instructions, the cutting assembly 48 cut the leading edge and/or profile. In addition, profile and diagonal cuts are performed in conjunction with movement of the end effector 32 relative to the form 16. In this regard, cutting operations and movement of the positioning device 12 are generally performed concurrently. In addition, while the course material 14 is being advanced, edge profile cuts based on the file 66 are performed on the course material 14 by the cutting assembly 48. In another embodiment, an edge of a previously applied course 28 is sensed in a manner similar to step 120 and the profile of the course material 14 is cut in a manner similar to step 122 prior to and/or during the step 116.

At step 118, the course material 14 is "tacked" to the substrate 30. The substrate 30 includes, at least, the form 16 and/or a previously applied course 28. For example, the positioning device 12 is controlled to move the end effector 32 to a starting position for the course 28 and into a suitable orientation. A downward force is applied to the course material 14, pressing the course material 14 down upon the form 16 with sufficient force to cause adhesion. In addition, the location on the form 16 is determined based upon the series of computer readable instruction and/or the location of a previously positioned course material 14. As described herein, the path of a course 28 placed adjacent to a previously applied course 28 is offset to generate the overlap 56 on the previously applied course 28. This overlap 56 or a portion thereof is cut away during profiling of the edge of the course material 14 at step 122.

At step 120, a previously applied course 28, if present, is sensed. That is, when applying a second course 28, the edge of the first course is sensed. More particularly, the edge 42 of the first course 28 at the interface between the first course 28 and the path of the second course 28 is sensed. In a similar manner, subsequent courses 28 are sensed.

At step 122, the profile of the course material 14 is generated in response to the edge sensed at step 120. For example, in response to signals from the sensor 38, the controller 92 determines a profile that corresponds to the sensed edge. The controller 92 further generates signals to modulate the cutting assembly 48 according to the determined profile. These signals are forwarded to the actuator 52. In this manner, a profile is generated upon the course material 14 that substantially corresponds to the previously applied course 28. Depending upon the course material 14, this profile is generated such that it overlaps, abuts, or approaches the edge of the previously applied course 28. A more detailed description of this method of slitting and applying plies is to be found in U.S. patent application Ser. No. 11/058,267, entitled, SLIT-COURSE PLY PLACEMENT DEVICE AND METHOD, filed on Feb. 16, 2005, by Roger J. LEDET, Trevor M. MCDONALD, and Arnold J. LAUDER, the disclosure of which is hereby incorporated in its entirety.

At step 124, the course material 14 is dispensed along a path across the form 16. As described herein, in order to minimize deformations in the course material 14 (e.g., wrinkles), this path is typically calculated to coincide with a "natural path" based upon any contours in the form 16. As the end effector 32 is controlled along the path across the form 16, the course material 14 is withdrawn or "free wheeled" from the supply roll 34 via the movement of the end effector 32 relative to the substrate 30. That is, the tacked portion of the course material 14 acts to pull course material 14 from the supply roll 34. In other embodiments, the course material 14 is advanced via the action of the supply roll 34, any suitable feed assembly, take-up roll, and the like. As the course material 14 is dispensed or applied, one or more edge profiles of the course material 14 are cut, as described at step 122, via the action of the cutting assembly 48 in response to the edge sensed at step 120.

At step 126, the placement of the course material 14 on the form 16 is optionally evaluated. For example, an operator or a sensor senses the relative position of the courses 28 and determine if the distance between these courses is within a predetermined tolerance. If the distance between these courses is not within the predetermined tolerance, an error may be generated at step 128. If the distance between these courses is within the predetermined tolerance, it is determined if the end of the path has been reached at step 130. In addition to placement of the course material 14, wrinkles, bridges, foreign objects, debris, and the like are optionally sensed for by an operator and/or sensor. If any such abnormalcy is sensed, an error is generated. In addition or alternatively, the placement of the courses 28 is optionally evaluated following the completion of the ply 58. It is an advantage of an embodiment that by leaving the separator film 40 on the course material 14 until the completion of the ply 58, the ply 58 is protected from contamination and/or physical insult that may occur during evaluation.

At step 130, it is determined if the end of the course has been reached. More specifically, it is determined if the course material 14 that is approaching the cutting assembly 48 is to be end cut. If, based on the series of computer readable instruction, it is determined the course material 14 has not advanced to the end of the course, the edge of the previously applied course is sensed at step 120. If, it is determined the course material 14 has advanced to the end of the course, the course material 14 is end cut at step 132.

At step 132, the end of the course material 14 is cut based upon the series of computer readable instruction contained in the file 66, the orientation of a previously positioned course material 14, and/or the location of a previously positioned course material 14.

At step 134, it is determined if the placement of course material 14 on the composite product has been completed. For example, if all of the computer readable instructions in the file 66 have been completed, it may be determined that the placement of plies 58 for the item 18 has been completed and the MAL 10 may idle until another series of computer readable instructions is initiated. If is determined the placement of course material 14 for the item 18 is not completed, an additional course material 14 placement may proceed at step 114.

Following the method 110, the composite product may be cured in any suitable manner. In the aerospace industry, thermoset resins are generally utilized to pre-impregnate ply material. These thermoset resins are typically cured at an elevated temperature and pressure for a predetermined amount of time. Times, pressures, and temperatures may be selected depending on the resin used, the size and thickness of the composite product, and the like.

Although an example of the end effector 32 is shown being controlled by the robotic vehicles 12, it will be appreciated that other control systems can be used. In this regard, a gantry system, robotic armature, mandrel, or other such positioning devices that support and control the movement of any suitable end effector are suitable for use with end effector 32. Also, although the MAL 10 is useful to place plies for composite products in the airline industry it is also suitable for use in other industries that construct composite product. These industries include, but are not limited to, automobile, marine, spacecraft, building, and consumer products.

The many features and advantages of the disclosure are apparent from the detailed specification, and thus, it is intended by the appended claims to cover all such features and advantages of the disclosure that fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A method of fabricating a composite item, comprising the steps of:
   generating a partial vacuum between a ply material and a form;
   advancing the partial vacuum and the ply material along the form;
   pressing the ply material onto the form substantially via atmospheric pressure;
   sensing an edge of a previously applied course of the ply material; and
   cutting a profile on the ply material in response to the sensed edge.

2. The method of claim 1 further comprising the step of:
   advancing a plurality of partial vacuums and a plurality of corresponding plies of material along the form to fabricate the composite item.

3. The method of claim 2 further comprising the step of:
   fabricating a ply of the composite item with the plurality of partial vacuums and the plurality of corresponding plies of material.

4. The method of claim 2 further comprising the step of:
   weaving the plurality of corresponding plies of material to fabricate the composite item.

5. The method of claim 1 further comprising the step of:
   guiding the advance of the partial vacuum and the ply material along the form.

6. The method of claim 1 further comprising the steps of:
   emitting a signal to guide the advance of the partial vacuum and the ply material along the form; and
   controlling the advance of the partial vacuum and the ply material along the form in response to the signal.

7. The method of claim 1 further comprising the steps of:
   sensing a temperature of the ply material; and
   modulating the temperature of the ply material in response to the sensed temperature.

8. A method of forming a ply of an aircraft composite product, comprising the steps of:
   positioning an end effector relative to a substrate using a robotic vehicle;
   guiding the robotic vehicle while dispensing course material from the end effector;
   generating a partial vacuum between the course material and the substrate while dispensing the course material;
   pressing the course material onto the substrate substantially via atmospheric pressure; and
   applying a layer of the course material to the substrate to form the ply.

9. The method of claim 8 further comprising the step of:
   initiating application of the course material at approximately a center portion of the substrate and working outwardly therefrom.

10. The method of claim 8 further comprising the step of:
    guiding the robotic vehicle using a laser guidance system.

11. The method of claim 10 wherein the step of guiding the robotic vehicle comprises:
    forwarding a signal from a laser emitter to the robotic vehicle;
    receiving the signal at a laser receiver; and
    controlling the robotic vehicle in response to the received signal.

12. The method of claim 8 further comprising the step of:
    cutting a side edge profile of the course material to coincide with an edge of a previously applied course material.

13. A method of manufacturing an aircraft composite product, the method comprising the steps of:
    positioning a plurality of end effectors relative to a substrate;
    dispensing course material from the end effectors;
    generating a partial vacuum between the course material and the substrate;
    pressing the course material onto the substrate substantially via atmospheric pressure;
    determining a position of at least one edge of a previously applied course material; and
    cutting the course material to generate a side edge profile.

14. The method of claim 13 further comprising the step of:
    positioning the end effectors relative to the substrate using at least one of the following: a robotic vehicle, a robotic armature, a gantry-type device.

15. The method of claim 13 wherein the end effectors are mounted to a corresponding plurality of robotic vehicles, the method further comprising the step of:
    coordinating the movement of the robotic vehicles to simultaneously apply the course material to the substrate.

16. The method of claim 13 further comprising the step of:
    applying a woven pattern of the course material to the substrate.

17. The method of claim 13 further comprising the step of:
    initiating application of the course material at approximately a center portion of the substrate and working outwardly therefrom.

18. The method of claim 13 further comprising the step of:
    applying a partial vacuum between the course material and the substrate while applying the course material to the substrate.

19. The method of claim 13 further comprising the step of:
    cutting the side edge profile to coincide with an edge of a previously applied course material.

20. The method of claim 13 wherein the substrate comprises at least one of the following: a layup form, a previously applied course of course material.

21. The method of claim 13 further comprising the step of:
    guiding at least one of the robotic vehicles using a laser guidance system.

22. The method of claim 21 wherein the step of guiding at least one of the robotic vehicles comprises:

forwarding a signal from a laser emitter to the robotic vehicles;

receiving the signal at a laser receiver; and controlling the robotic vehicle in response to the received signal.

23. The method of claim 22 further comprising the steps of:

receiving instructions from a user; and forwarding the signals to the laser emitter.

24. A method of manufacturing an aircraft composite structure using a machine assisted laminator, the method comprising the steps of:

positioning a plurality of end effectors relative to a form using a plurality of robotic vehicles;

guiding the robotic vehicles using a laser guidance system while dispensing course material from the end effectors;

applying the course material to the form while applying a partial vacuum between the course material and the form;

pressing the course material onto the form substantially via atmospheric pressure;

coordinating the movement of the robotic vehicles to simultaneously apply course material to the form;

sensing an edge of a previously applied course of course material; and cutting a profile on the course material in response to the sensed edge to generate a side edge profile.

25. The method of claim 24 wherein the step of guiding the robotic vehicles comprises:

forwarding signal from at least one laser emitter to the robotic vehicles;

receiving the signals at a plurality of laser receivers corresponding to the plurality of robotic vehicles; and controlling the robotic vehicles in response to the received signals.

* * * * *